(12) United States Patent
Shi (10) Patent No.: US 12,028,605 B2
(45) Date of Patent: Jul. 2, 2024

(54) METHOD FOR IMAGE COLLECTION, COMPUTER STORAGE MEDIUM, AND VEHICLE

(71) Applicant: Shanghai Qwik Smart Technology Co., Ltd., Shanghai (CN)

(72) Inventor: Hongren Shi, Shanghai (CN)

(73) Assignee: SHANGHAI QWIK SMART TECHNOLOGY CO., LTD., Shanghai (CN)

( * ) Notice: Subject to any disclaimer, the term of this patent is extended or adjusted under 35 U.S.C. 154(b) by 93 days.

(21) Appl. No.: 17/791,836

(22) PCT Filed: Jan. 8, 2021

(86) PCT No.: PCT/CN2021/070803
§ 371 (c)(1),
(2) Date: Jul. 8, 2022

(87) PCT Pub. No.: WO2021/139749
PCT Pub. Date: Jul. 15, 2021

(65) Prior Publication Data
US 2023/0262326 A1     Aug. 17, 2023

(30) Foreign Application Priority Data

Jan. 9, 2020   (CN) .......................... 202010021734.3

(51) Int. Cl.
*G06T 7/00*     (2017.01)
*G06T 7/73*     (2017.01)
(Continued)

(52) U.S. Cl.
CPC ............. *H04N 23/661* (2023.01); *G06T 7/74* (2017.01); *H04N 7/183* (2013.01); *H04N 23/62* (2023.01);
(Continued)

(58) Field of Classification Search
CPC ...... H04N 23/661; H04N 7/183; H04N 23/62; H04N 23/695; H04N 23/698; H04N 23/54;
(Continued)

(56) References Cited

U.S. PATENT DOCUMENTS

| 11,580,692 B2 * | 2/2023 | Saracchini ........... H04N 23/633 |
| 11,615,616 B2 * | 3/2023 | Chen ....................... G06F 3/016 |
| | | 345/633 |

(Continued)

FOREIGN PATENT DOCUMENTS

| CN | 203250200 U | 10/2013 |
| CN | 103426282 A | 12/2013 |

(Continued)

OTHER PUBLICATIONS

Almazan Javier et al., Full auto-calibration of a smartphone on board a vehicle using IMU and GPS embedded sensors, 2013 IEEE Intelligent Vehicles Symposium (IV), IEEE, Jun. 23, 2013, pp. 1374-1380, XP032501976, ISSN: 1931-0587, DOI: 10.1109/IVS.2013.6629658.

(Continued)

*Primary Examiner* — Frank F Huang
(74) *Attorney, Agent, or Firm* — Troutman Pepper Hamilton Sanders LLP (57) ABSTRACT

A method for image collection, a computer storage medium, and a vehicle are provided. The method includes the following. An initial photographing direction of a mobile device associated with a vehicle is obtained, in response to determining that a predetermined condition is satisfied. An in-vehicle photography apparatus of the vehicle is adjusted to an initial orientation, to match a photographing direction at the initial orientation of the in-vehicle photography apparatus with the initial photographing direction of the mobile (Continued)

device. A drive signal configured to adjust the photographing direction of the in-vehicle photography apparatus is generated, based on a detecting signal of a sensor of the mobile device, such that the photographing direction of the in-vehicle photography apparatus synchronously varies with a pose of the mobile device. A surrounding image collected via the in-vehicle photography apparatus is transmitted to the mobile device, to display the surrounding image at the mobile device.

20 Claims, 7 Drawing Sheets

(51) Int. Cl.
  *H04N 7/18* (2006.01)
  *H04N 23/62* (2023.01)
  *H04N 23/661* (2023.01)
  *H04N 23/695* (2023.01)
  *H04N 23/698* (2023.01)
  *H04N 23/54* (2023.01)

(52) U.S. Cl.
  CPC ......... *H04N 23/695* (2023.01); *H04N 23/698* (2023.01); *G06T 2207/20081* (2013.01); *G06T 2207/30244* (2013.01); *G06T 2207/30252* (2013.01); *H04N 23/54* (2023.01)

(58) Field of Classification Search
  CPC .......... H04N 23/61; H04N 23/60; G06T 7/74; G06T 2207/20081; G06T 2207/30244; G06T 2207/30252
  See application file for complete search history.

(56) References Cited

U.S. PATENT DOCUMENTS

| | | | |
|---|---|---|---|
| 11,625,900 B2* | 4/2023 | Shore | G06T 13/20 345/581 |
| 11,681,791 B2* | 6/2023 | Ganeshmani | G06F 3/04842 726/2 |
| 2008/0020481 A1* | 1/2008 | Yamamoto | G01N 21/0332 436/164 |
| 2010/0083772 A1* | 4/2010 | Tanaka | G01N 35/026 73/863.91 |
| 2012/0156796 A1* | 6/2012 | Drechsler | G01N 21/03 422/63 |
| 2012/0169874 A1 | 7/2012 | Thomas et al. | |
| 2013/0217141 A1* | 8/2013 | Lenhard | B01L 3/5453 436/164 |
| 2015/0035998 A1 | 2/2015 | Mathew et al. | |
| 2015/0268666 A1* | 9/2015 | Wang | G05D 1/0016 701/2 |
| 2019/0028637 A1* | 1/2019 | Kolesov | H04N 23/63 |

FOREIGN PATENT DOCUMENTS

| | | |
|---|---|---|
| CN | 104683699 A | 6/2015 |
| CN | 105872383 A | 8/2016 |
| CN | 106888368 A | 6/2017 |
| CN | 107730641 A | 2/2018 |
| CN | 109246358 A | 1/2019 |

OTHER PUBLICATIONS

The extended European search report issued in corresponding EP application No. 21738998.0 dated Apr. 17, 2023.
First Office Action issued in corresponding CN Application No. CN202010021734.3, mailed Oct. 28, 2021, p. 1-8, Beijing, China.
PCT/CN2021/070803 International Search Report mailed Mar. 30, 2021.

* cited by examiner

METHOD FOR IMAGE COLLECTION, COMPUTER STORAGE MEDIUM, AND VEHICLE

CROSS-REFERENCE TO RELATED APPLICATION(S)

This application claims priority to International Application No. PCT/CN2021/070803, filed on Jan. 8, 2021, which claims priority to Chinese Patent Application No. 202010021734.3, filed on Jan. 9, 2020, the entire disclosures of which are hereby incorporated by reference in their entireties.

TECHNICAL FIELD

This disclosure relates to the field of image processing and vehicles, and in particular to a method for image collection, a computer storage medium, and a vehicle.

BACKGROUND

Traditional solutions for image collection related to a vehicle include two main types. The first type is that, for example, a photographer in the vehicle photographs an image outside a vehicle by using a mobile device (e.g., a mobile phone). The second type is that, for example, an image is collected by using cameras (e.g., a rear view camera) equipped in the vehicle and is displayed on an in-vehicle display to assist in parking. For the first solution for image collection, it is hard to collect the image expected by the photographer, such as a surrounding image of a roof, a rear, or a side of the vehicle, due to being sheltered by a vehicle body or a limitation of a photographing angle in the vehicle. While for the second solution for image collection, current cameras equipped in the vehicle cannot be informed with a photographing intention of the photographer, and are difficult to cooperatively collect the surrounding image that meets expectations of the photographer, because the cameras equipped in the vehicle are mainly used for driving assistance and are respectively equipped in multiple different locations of the vehicle, including, for example, an interior view camera, a rear view camera, a front view camera, a side view camera, and so on.

Therefore, in the traditional solutions for image collection, it is impossible to collect images that are not limited by the photographing angle in the vehicle, according to the photographing intention of the photographer in the vehicle, because of many reasons such as the shelter by the vehicle body and installation location limitations of the cameras.

SUMMARY

In the disclosure, a method for image collection, an electronic device, a computer storage medium, and a vehicle are provided, which can collect images that are not limited by a photographing angle in the vehicle, according to a photographing intention of a photographer in the vehicle.

According to a first aspect of the disclosure, a method for image collection is provided. The method includes the following. An initial photographing direction of a mobile device associated with a vehicle is obtained, in response to determining that a predetermined condition is satisfied. An in-vehicle photography apparatus of the vehicle is adjusted to an initial orientation, to match a photographing direction at the initial orientation of the in-vehicle photography apparatus with the initial photographing direction of the mobile device. A drive signal configured to adjust the photographing direction of the in-vehicle photography apparatus is generated, based on a detecting signal of a sensor of the mobile device, such that the photographing direction of the in-vehicle photography apparatus synchronously varies with a pose of the mobile device. A surrounding image collected via the in-vehicle photography apparatus is transmitted to the mobile device, to display the surrounding image at the mobile device.

According to a second aspect of the disclosure, a non-transitory computer-readable storage medium is provided. The non-transitory computer-readable storage medium stores a machine-executable instruction thereon, which when executed, causes a machine to perform the method of the first aspect of the disclosure.

According to a third aspect of the disclosure, a vehicle is provided. The vehicle includes an in-vehicle calculating device and an in-vehicle photography apparatus. The in-vehicle calculating device is configured to generate a drive signal configured to adjust a photographing direction of an in-vehicle photography apparatus based on a detecting signal of a sensor of a mobile device associated with the vehicle, such that the photographing direction of the in-vehicle photography apparatus synchronously varies with a pose of the mobile device. The in-vehicle photography apparatus is equipped at a roof of the vehicle and at least includes a camera and a first rotation apparatus. The camera is configured to collect a surrounding image, where the surrounding image is transmitted to the mobile device for display. The first rotation apparatus is configured to drive the camera to rotate around a first axis.

The summary is provided to introduce a selection of concepts of the disclosure in a simplified form, which will be further described in the following detailed description. The summary does not intend to identify key features or essential features of the present disclosure, nor does it intend to limit the scope of the present disclosure.

BRIEF DESCRIPTION OF THE DRAWINGS

The foregoing and other features, advantages, and aspects of implementations of the present disclosure will become more apparent in conjunction with the accompanying drawings and with reference to the following detailed description. In the accompanying drawings of the present disclosure, the same or similar accompanying drawings numerals generally represent the same or similar elements.

DETAILED DESCRIPTION

Preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

As mentioned above, in the above-mentioned related solutions for image collection, it is impossible to collect images that are not limited by the photographing angle in the vehicle, according to the photographing intention of the photographer in the vehicle, because of many reasons such as the shelter by the vehicle body and installation location limitations.

To solve at least partly the foregoing problem and one or more of other potential problems, a method for image collection is provided according to example implementations of the disclosure. The method includes the following. An initial photographing direction of a mobile device associated with a vehicle is obtained, in response to determining that a predetermined condition is satisfied. An in-vehicle photography apparatus of the vehicle is adjusted to an initial orientation, to match a photographing direction at the initial orientation of the in-vehicle photography apparatus with the initial photographing direction of the mobile device. A drive signal configured to adjust the photographing direction of the in-vehicle photography apparatus is generated, based on a detecting signal of a sensor of the mobile device, such that the photographing direction of the in-vehicle photography apparatus synchronously varies with a pose of the mobile device. A surrounding image collected via the in-vehicle photography apparatus is transmitted to the mobile device, to display the surrounding image at the mobile device.

In the above-mentioned method, the in-vehicle photography apparatus is adjusted to the initial orientation matched with the initial photographing direction of the mobile device by determining that the predetermined condition is satisfied. The drive signal is generated, based on the detecting signal of the sensor of the mobile device, such that the photographing direction of the in-vehicle photography apparatus synchronously varies with the pose of the mobile device. Further, the surrounding image collected via the in-vehicle photography apparatus is transmitted to the mobile device. Therefore, in the disclosure, it is possible to adjust a photographing angle of the in-vehicle photography apparatus synchronously by adjusting an orientation a mobile phone, and the mobile device may display the surrounding image collected via the synchronously adjusted in-vehicle photography apparatus. Therefore, it is also possible to collect the surrounding image outside the vehicle according to a photographing intention of a photographer in the vehicle, and the image collected is not limited by a photographing field of view in the vehicle.

Figure 1:
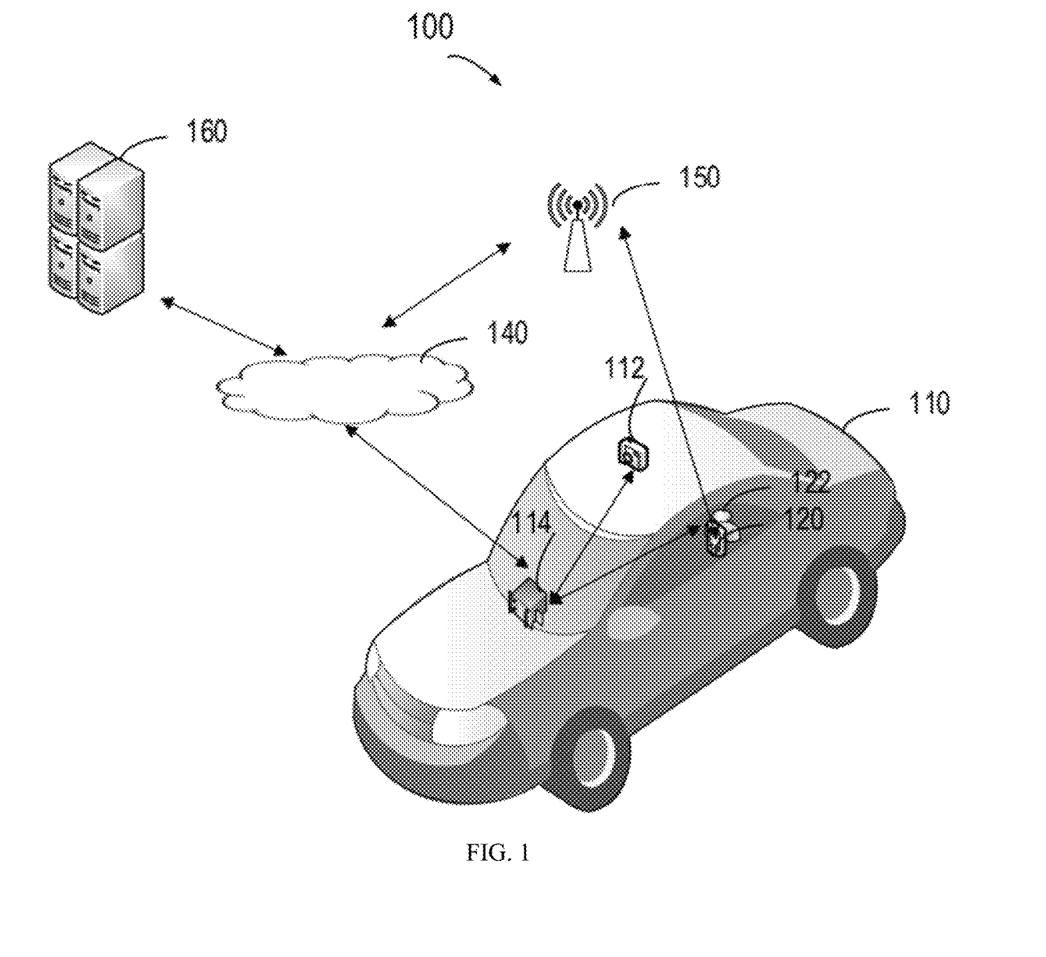
FIG. 1 is a schematic diagram illustrating a system 100 of a method for image collection according to implementations of the disclosure.

FIG. 1 is a schematic diagram illustrating a system 100 of a method for image collection according to implementations of the disclosure. As illustrated in FIG. 1, the system 100 includes a vehicle 110, a mobile device 120, and a server 160. In some examples, the vehicle 110, the mobile device 120 of a user 122 (e.g., a passenger), and the server 160, for example, may perform data interaction via a base station 150 or a network 140. The vehicle 110 and the mobile device 120 may also perform data interaction and sharing via wireless communication methods, such as wireless fidelity (Wi-Fi), Bluetooth, cellular, and near field communication (NFC).

The vehicle 110 includes for example at least an in-vehicle calculating device 114 (such as a video audio entertainment system (VAES)), an in-vehicle data sensing device, an in-vehicle telematics BOX (T-BOX), and the like. The in-vehicle data sensing device is configured to perceive vehicle data of its own and external environment data where the vehicle is located in real time. The in-vehicle data sensing device includes at least multiple in-vehicle photography apparatuses 112, such as a front view camera, a rear view camera, a roof-mounted photography apparatus, and the like. The front view camera is configured to collect a surrounding image of the front of the vehicle and the rear view camera is configured to collect a surrounding image of the rear of the vehicle. The roof-mounted photography apparatus is configured to adjust a photographing direction based on a received drive signal, such that the photographing direction of the roof-mounted photography apparatus covers a panoramic view of the surrounding image of the external environment of the vehicle. The vehicle 110 and the mobile device 120 may perform data interaction and sharing via wireless communication methods such as Wi-Fi, Bluetooth, cellular, and NFC. For example, the mobile device 120 can establish an association with the vehicle 110 when a predetermined action (e.g., shaking) of the mobile device 120 is detected. By establishing the association between the mobile device 120 and the vehicle 110 through the predetermined action (e.g., shaking), it is possible to establish a connection between the vehicle and an associated mobile device of a specific user (e.g., a driver) in a secure manner, so as to share data and computing resources.

The in-vehicle T-BOX is configured to perform data interaction with the in-vehicle calculating device 114 (such as the VAES), the mobile device 120, and the server 160. In some examples, the in-vehicle T-BOX includes, for example, a subscriber identity module (SIM) card, a global position system (GPS) antenna, a 4th generation (4G) antenna, or a 5th generation (5G) antenna. When the user sends a control command (such as remotely starting the vehicle, opening an air conditioning, adjusting a seat to a proper position) via an application (APP) of the mobile device 120 (such as a mobile phone), a telematics service provider (TSP) will send in background a monitoring request instruction to the in-vehicle T-BOX. After the vehicle obtains the control command, it sends a control packet and implements control of the vehicle via a controller area network (CAN) bus, and finally feeds back an operation result to the APP of the mobile device 120 of the user. The in-vehicle T-BOX and the VAES communicate via the CAN bus to implement data interaction, such as transmitting state information of the vehicle, button state information of the vehicle, a control instruction. The in-vehicle T-BOX may collect bus data related to a bus of the vehicle 110 such as a diagnose CAN (DCAN), a kommunikation CAN (KCAN), and a power train CAN (PTCAN).

The roof-mounted photography apparatus, in some examples, includes, for example, a camera, a first rotation apparatus, a second rotation apparatus, and an elevating apparatus. The first rotation apparatus is configured to drive the camera to rotate 360 degrees around a first axis. The second rotation apparatus is configured to drive the camera to rotate (a rotation angle range, for example, between 0 and 360 degrees) around a second axis, where the second axis is perpendicular to the first axis. The elevating apparatus is configured to drive the camera to move in a vertical direction. In some examples, the elevating apparatus is configured to extend the roof-mounted photography apparatus out from inside of the vehicle, or retract the roof-mounted photography apparatus from outside of the vehicle. The roof-mounted photography apparatus may perform data interaction and sharing with the mobile device 120 via the vehicle 110 (e.g., the in-vehicle calculating device 114 and/or the in-vehicle T-BOX). The roof-mounted photography apparatus may also perform data interaction and sharing directly with the mobile device 120 via wireless communication methods such as Wi-Fi, Bluetooth, cellular, and NFC. In some examples, the roof-mounted photography apparatus further includes a NFC module configured to perform a short-range communication with electronic devices, such as the mobile device 120. NFC has a communication distance within tens of centimeters, an operating frequency of 13.56 MHz, and a transmission speed which is, for example, but not limited to 106 Kbit/s, 212 Kbit/s, or 424 Kbit/s. The roof-mounted photography apparatus may conveniently and safely exchange data with the mobile device 120 based on the NFC module, when the mobile device 120 touches or approaches the roof-mounted photography apparatus (e.g., the mobile device 120 touches a roof of the vehicle near the roof-mounted photography apparatus), where the exchanged data is validation information, for example, a Wi-Fi password. The mobile device 120 may obtain the surrounding image collected via the roof-mounted photography apparatus, based on the validation information obtained, when the predetermined condition is satisfied. In some examples, the vehicle 110 may also equip one or more NFC modules at other predetermined locations in the vehicle (e.g., at a vehicle door), to facilitate passengers at different locations in the vehicle to conveniently obtain the validation information by approaching or touching the predetermined locations with the mobile device 120. Since a NFC technology has higher security compared to Bluetooth, ZigBee, infrared, Wi-Fi and other technologies, the NFC technology has performance advantages in the short-range communication, and the NFC technology has lower costs, simple setup procedures, and short communication establishment time of only about 0.1 s. Therefore, in the disclosure, it is possible to take into account both a low energy consumption of information interaction and information security at the same time, by obtaining the validation information based on the NFC technology.

The mobile device 120 is, for example, but not limited to, a mobile phone. The mobile device 120 may perform data interaction directly with the in-vehicle T-BOX, or with the server 160 via the base station 150 or the network 140. In some examples, the mobile device 120 may be a tablet computer, a mobile phone, a wearable device, and the like.

The server 160 is configured to, for example, provide services of internet of vehicles. The server 160, for example, performs data interaction with the vehicle 110 and the mobile device 120 via the network 140 or the base station 150. In some examples, the server 160 may have one or more processing units, including dedicated processing units such as graphics processing units (GPUs), field-programmable gate arrays (FPGAs), and application specific integrated circuits (ASICs), and general-purpose processing units such as central processing units (CPUs). In addition, one or more virtual machines may also be running on each computing device.

Figure 2:
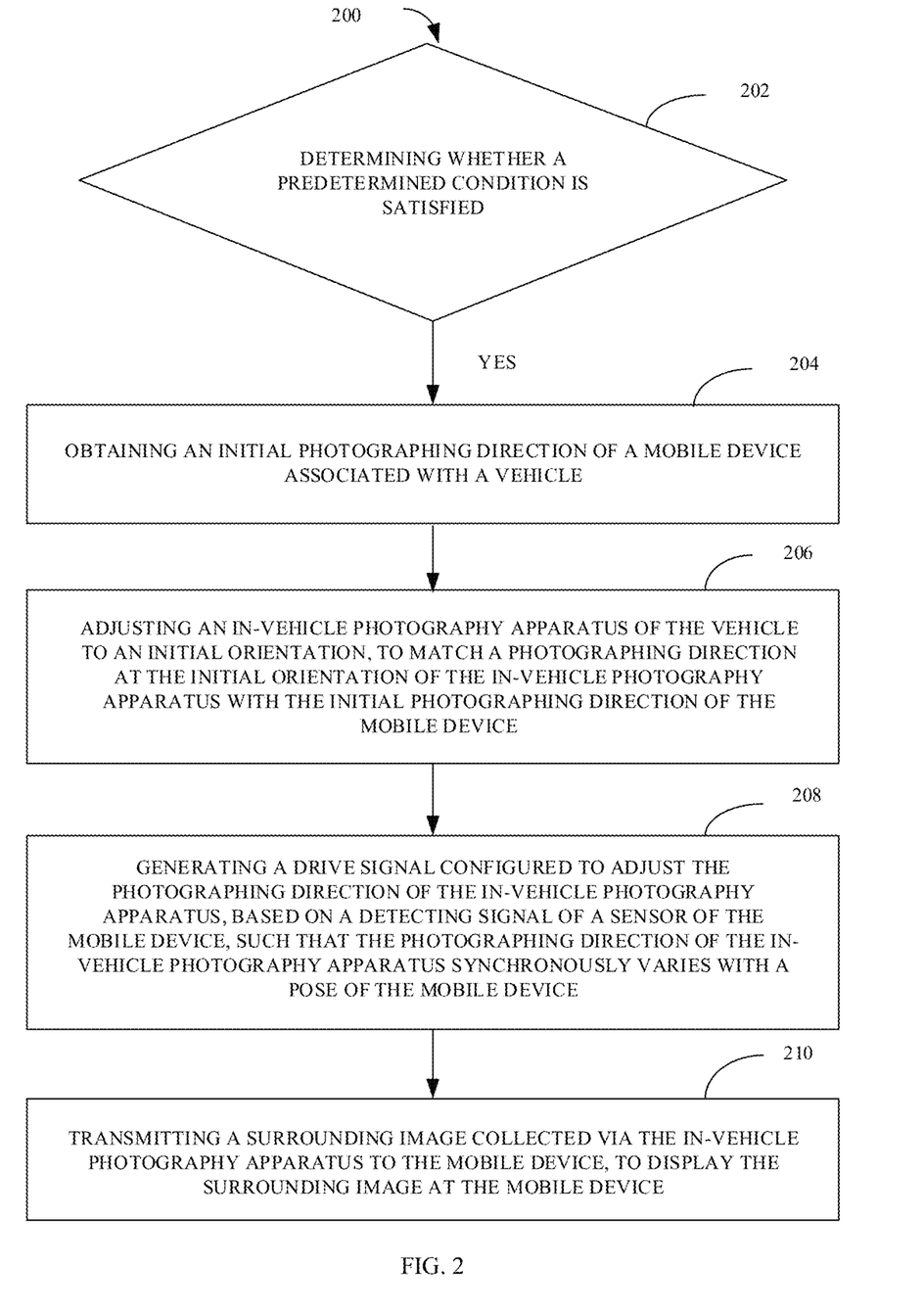
FIG. 2 is a schematic flow chart illustrating a method 200 for image collection according to implementations of the disclosure.
Figure 7:
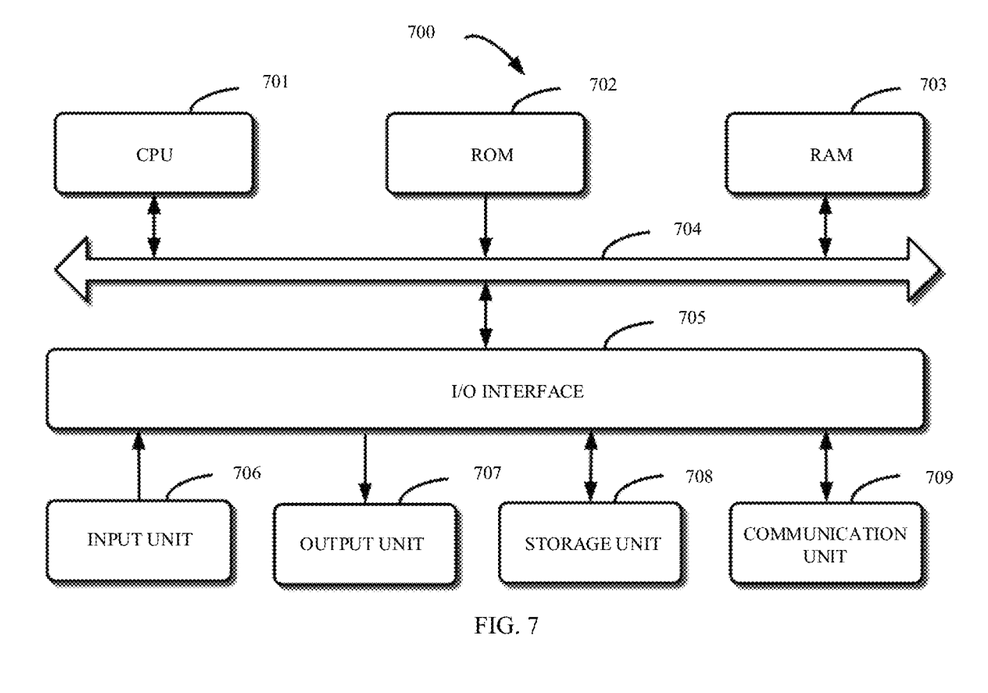
FIG. 7 is a schematic block diagram illustrating an electronic device 700 applicable to implement implementations of the disclosure.

In the following, a method for image collection of implementations of the disclosure will be described in conjunction with FIG. 2. FIG. 2 is a schematic flow chart illustrating a method 200 for image collection according to implementations of the disclosure. It should be understood that, for example, the method 200 may be performed by the electronic device 700 as shown in FIG. 7 or may be performed by the mobile device 120 or the vehicle 110 (for example, but not limited to the in-vehicle calculating device 114 such as the VAES) as shown in FIG. 1. It should be noted that the method 200 may further include additional actions not shown and/or may omit actions shown, and the disclosure is not limited thereto.

At block 202, the in-vehicle calculating device 114 determines whether a predetermined condition is satisfied. In some implementations, the in-vehicle calculating device 114 determines that the predetermined condition is satisfied as follows. The in-vehicle calculating device 114 determines that verification of validation information from the mobile device 120 already passes, where the validation information is obtained by the mobile device 120 via touching a predetermined location of the vehicle 110, and at least one of the following conditions is satisfied. A photographing direction of the mobile device 120 coincides with a travel direction of the vehicle 110, or a predetermined action at the mobile device 120 is detected. The mobile device 120, for example, obtains the validation information (e.g., a Wi-Fi password) via touching the predetermined location (e.g., a door or a roof of the vehicle) of the vehicle 110, and the in-vehicle calculating device 114 determines that the verification of the validation information transmitted by the mobile device 120 passes. The in-vehicle calculating device 114 determines that the predetermined condition is satisfied in a case that the in-vehicle calculating device 114 further detects that the photographing direction of the mobile device 120 coincides with the travel direction of the vehicle 110 (e.g., a Z axis of the mobile device 120 is parallel to the travel direction of the vehicle 110, or a direction perpendicular to a display of the mobile device 120 is parallel to a longitudinal direction of the vehicle 110), or determines that the predetermined action at the mobile device 120 is detected.

At block 204, the in-vehicle calculating device 114 obtains an initial photographing direction of the mobile device 120 associated with the vehicle 110, in response to determining that the predetermined condition is satisfied.

For example, the in-vehicle calculating device 114 obtains the initial photographing direction of the mobile device 120 at a time point t0, when the in-vehicle calculating device determines that the predetermined condition is satisfied. For example, the in-vehicle calculating device obtains detection information of a gyro-sensor and an acceleration sensor of the mobile device 120 at the time point t0, e.g., at the time point t0, angular velocities of the mobile device 120 at three axes (an X axis, a Y axis, and the Z axis of the mobile device 120) are respectively ax, ay, and az. The X axis of the mobile device 120 is a width direction of the mobile device 120. When the top of the mobile device 120 points upwards, an X-axis positive direction is along the display of the mobile device 120 to the right, and an X-axis negative direction is along the display of the mobile device 120 to the left. The Y axis is the longitudinal direction of the mobile device 120. A Y-axis positive direction points upwards from the top of the display of the mobile device 120, and a Y-axis negative direction points downwards from that of the mobile device 120. The Z axis is the direction perpendicular to the display of the mobile device 120. A Z-axis positive direction is perpendicular to the display and points outwards, and a Z-axis negative direction is perpendicular to the display and points inwards.

In some implementations, the in-vehicle calculating device 114 may also obtain an image feature(s) in the image collected by the mobile device 120 at the initial photographing direction to identify the initial photographing direction of the mobile device 120. For example, the image collected by the mobile device is obtained, when the in-vehicle calculating device 114 determines that a photography apparatus of the mobile device 120 is already turned on, and the image feature(s) in the image collected by the mobile device 120 is extracted to identify the initial photographing direction of the mobile device 120.

At block 206, the in-vehicle calculating device 114 adjusts the in-vehicle photography apparatus 112 of the vehicle 110 to the initial orientation, to match the photographing direction at the initial orientation of the in-vehicle photography apparatus 112 with the initial photographing direction of the mobile device 120. In some implementations, the matching means that, for example, photographing direction values of the in-vehicle photography apparatus 112 and the mobile device 120 are approximately the same, or a photographing direction deviation of the in-vehicle photography apparatus 112 and the mobile device 120 is within a predetermined threshold range.

In some implementations, in order to determine whether the in-vehicle photography apparatus 112 (e.g., a roof-mounted photography apparatus) is already adjusted to the initial orientation, the in-vehicle calculating device 114 may obtain the image feature(s) in the image collected by the mobile device 120 at the initial photographing direction, and the in-vehicle calculating device may obtain a surrounding image collected via the roof-mounted photography apparatus. It is determined that the roof-mounted photography apparatus is already adjusted to the initial orientation, when the in-vehicle calculating device determines that the surrounding image collected via the roof-mounted photography apparatus is matched with the image feature(s) in the image collected by the mobile device 120 at the initial photographing direction.

In some implementations, indication information is transmitted to the mobile device 120, when the in-vehicle calculating device 114 determines that the in-vehicle photography apparatus 112 (e.g., the roof-mounted photography apparatus) is already adjusted to the initial orientation. The in-vehicle photography apparatus 112 is controlled to photograph or record the surrounding image, when the in-vehicle calculating device 114 determines that a predetermined operation at the mobile device 120 or a predetermined voice input is detected. In the disclosure, by using the above-mentioned method, it is possible to conveniently control a photographing action of the in-vehicle photography apparatus 112, by recognizing a user voice in the vehicle or a user operation on the mobile phone.

The in-vehicle photography apparatus 112 (e.g., the roof-mounted photography apparatus), in some implementations, is a panoramic photography apparatus equipped at the roof of the vehicle 110. The panoramic photography apparatus at least includes a camera, a first rotation apparatus configured to drive the camera to rotate around a first axis, a second rotation apparatus configured to drive the camera to rotate around a second axis (where the second axis is perpendicular to the first axis), and an elevating apparatus configured to drive the camera to move in a vertical direction. The first rotation apparatus is configured to, for example, rotate driven by a first drive signal, and the second rotation apparatus is configured to, for example, rotate driven by a second drive signal. In some implementations, the in-vehicle photography apparatus 112 further includes an NFC module configured to cause the mobile device 120 to obtain validation information for verification of the mobile device 120 via touching or approaching the in-vehicle photography apparatus 112. In the following, a structure and a drive mechanism of the in-vehicle photography apparatus 112 (e.g., the roof-mounted photography apparatus) will be described in detail in conjunction with FIG. 3, which will not be repeated herein.

The in-vehicle calculating device 114 can adjust the in-vehicle photography apparatus 112 of the vehicle 110 to the initial orientation in various ways. For example, the in-vehicle calculating device 114 may determine the initial orientation of the in-vehicle photography apparatus 112 based on location information of an internal component of the vehicle 110 and the image feature(s), if the in-vehicle calculating device 114 determines that the image feature(s) in the image collected by the mobile device 120 at the initial photographing direction is associated with the internal component. In the following, a method for adjusting the in-vehicle photography apparatus 112 to the initial orientation will be described in detail in conjunction with FIG. 6, which will not be repeated herein.

At block 208, the in-vehicle calculating device 114 generates a drive signal configured to adjust the photographing direction of the in-vehicle photography apparatus 112, based on a detecting signal of a sensor of the mobile device 120, such that the photographing direction of the in-vehicle photography apparatus 112 synchronously varies with a pose of the mobile device 120. In some examples, the detecting signal of the sensor of the mobile device 120 is at least one of, for example, an acceleration, an angular velocity, or a magnetic field data obtained by an acceleration sensor, the gyro-sensor, and an electronic compass of the mobile device 120.

There are various methods for generating the drive signal configured to adjust the photographing direction of the in-vehicle photography apparatus 112. In some implementations, the in-vehicle calculating device 114 may obtain pose angle change information of a current orientation of the mobile device 120 relative to an orientation corresponding to the initial photographing direction, and may generate the drive signal configured to drive at least one of the first rotation apparatus or the second rotation apparatus to rotate, based on the pose angle change information. The drive signal includes at least one of the first drive signal or the second drive signal. The first drive signal is configured to drive the first rotation apparatus of the in-vehicle photography apparatus 112 (e.g., the roof-mounted photography apparatus), and the second drive signal is configured to drive the second rotation apparatus of the in-vehicle photography apparatus 112. In the following, a method for generating the drive signal configured to adjust the photographing direction of the in-vehicle photography apparatus 112, based on a detecting signal of a pose sensor of the mobile device 120, will be described in detail in conjunction with FIG. 3 and FIG. 5, which will not be repeated herein.

The method for generating the drive signal configured to adjust the photographing direction of the in-vehicle photography apparatus 112, in some implementations, is described as follows. The in-vehicle calculating device 114 can determine whether the detecting signal of the pose sensor of the mobile device 120 and a detecting signal of the acceleration sensor of the mobile device 120 are both in a predetermined range. The in-vehicle calculating device 114 can generate the drive signal configured to adjust the photographing direction of the in-vehicle photography apparatus 112, based on the detecting signal of the pose sensor of the mobile device, when the in-vehicle calculating device 114 determines that the detecting signal of the pose sensor of the mobile device 120 and the detecting signal of the acceleration sensor of the mobile device 120 are both in the predetermined range. For example, when the in-vehicle calculating device 114 determines that at least one of the detecting signal of the pose sensor of the mobile device 120 or the detecting signal of the acceleration sensor of the mobile device 120 exceeds the predetermined range, it is determined that the mobile device 120 may occur unexpected situations such as shaking, vibrating, dropping, etc., and thus the in-vehicle calculating device 114 will not generate the drive signal based on the detection signal of the sensor of the mobile device 120 in the above-mentioned unexpected situations. By using the above-mentioned method, it is possible to prevent the in-vehicle photography apparatus 112 from being incorrectly adjusted due to unexpected situations of the mobile device 120 such as shaking, vibrating, and dropping.

At block 210, the in-vehicle calculating device 114 transmits the surrounding image collected via the in-vehicle photography apparatus 112 to the mobile device 120, to display the surrounding image at the mobile device 120. The image collected via the in-vehicle photography apparatus 112 may be a photo or video data.

A method for transmitting the surrounding image, in some implementations, is described as follows. The in-vehicle photography apparatus 112 can collect the surrounding image outside the vehicle in real time and form the video data, process and package the video data, and send the packaged video data to the in-vehicle calculating device 114. The in-vehicle calculating device 114 can transmit the received packaged video data to the mobile device 120 via Wi-Fi or a universal serial bus (USB) interface. The mobile device 120 can unpack and process the received packaged data, for reconstructing a complete video data stream for displaying on the display. In some implementations, the in-vehicle photography apparatus 112 can also directly transmit the packaged video data to the mobile device 120 via Wi-Fi.

In some examples, the mobile device 120 can also control the in-vehicle photography apparatus 112 (e.g., the roof-mounted photography apparatus) to photograph or capture images, move (e.g., elevate, rotate along the vertical direction), adjust the photographing field of view, and other operations, directly through predetermined operations on the display (e.g., click-to-select, sliding, zooming, and other actions) or via the in-vehicle calculating device 114.

In some examples, the in-vehicle calculating device 114 may also transform the surrounding image collected via the in-vehicle photography apparatus 112 to fit the display of the mobile device.

In the above-mentioned method, the in-vehicle photography apparatus 112 is adjusted to the initial orientation matched with the initial photographing direction of the mobile device by determining that the predetermined condition is satisfied. The drive signal is generated, based on the detecting signal of the sensor of the mobile device, such that the photographing direction of the in-vehicle photography apparatus 112 synchronously varies with the pose of the mobile device. Further, the surrounding image collected via the in-vehicle photography apparatus 112 is transmitted to the mobile device. Therefore, in the disclosure, it is possible to adjust a photographing angle of the in-vehicle photography apparatus 112 synchronously by adjusting an orientation of a mobile phone, and the mobile device may display the surrounding image collected via the synchronously adjusted in-vehicle photography apparatus 112. Therefore, it is also possible to collect images according to a photographing intention of a photographer in the vehicle, without limitations of the photographing angle in the vehicle.

Figure 3:
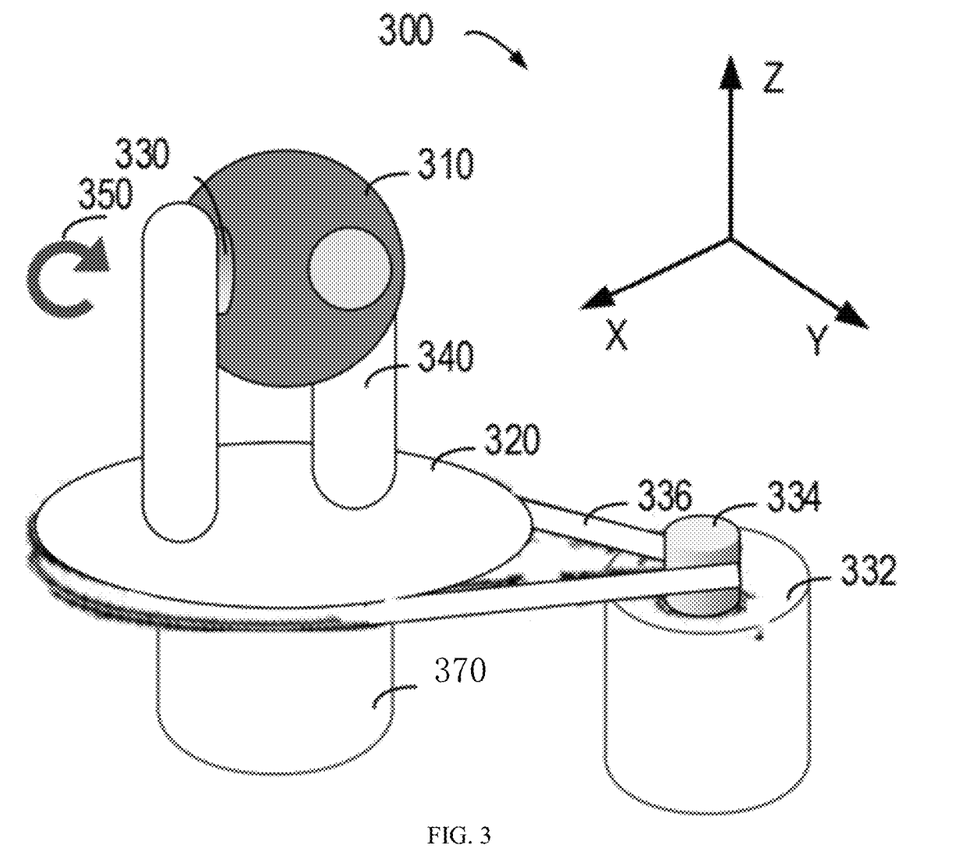
FIG. 3 is a schematic diagram illustrating an in-vehicle photography apparatus 300 according to implementations of the disclosure.

FIG. 3 is a schematic diagram illustrating an in-vehicle photography apparatus 300 according to implementations of the disclosure. It should be noted that the in-vehicle photography apparatus 300 may further include additional structures not shown and/or may omit structures shown, and the disclosure is not limited thereto.

As illustrated in FIG. 3, the in-vehicle photography apparatus 300, for example, includes a camera 310, a first rotation apparatus 320, a second rotation apparatus 330, and an elevating apparatus 370.

The first rotation apparatus 320 may rotate from 0 to 360 degrees around a first axis (that is, a vertical axis perpendicular to a horizontal plane, such as the Z axis) in a first plane (e.g., the horizontal plane). In some examples, a rotation range of the first rotation apparatus 320 may also be less than 360 degrees. The first rotation apparatus 320 is, for example, connected with a rotary shaft of a first drive source (not shown). As shown in FIG. 3, the first rotation apparatus 320 may also be driven to rotate by a rotary shaft 334 of the first drive source (e.g., a first motor 332) and a first drive mechanism (e.g., a gear or a transmission belt 326). In some examples, a rotation angle of the first rotation apparatus 320 is controlled by the first drive signal.

The second rotation apparatus 330 may rotate from 0 to 360 degrees around a second axis (e.g., a horizontal axis parallel to the first plane and perpendicular to the first axis). In some examples, the second rotation apparatus 330 may also rotate less than 360 degrees, such as rotate in a clockwise direction as shown by an arrow 350 in FIG. 3 or in a counterclockwise direction. The second rotation apparatus 330 is, for example, a second drive source (e.g., a second motor, which includes a rotor and a stator connected with the rotary shaft), and the rotary shaft of the second rotation apparatus 330 may be connected with the camera 310 directly or via a second drive mechanism (e.g., the gear). The photographing direction of the camera 310 rotates along with rotation of the rotary shaft of the second rotation apparatus 330. In some examples, a rotation angle of the second rotation apparatus 330 is controlled by the second drive signal. The second rotation apparatus 330 has a fixed portion (e.g., a housing of the second motor) fixedly connected with a support device 340.

The housing of the second rotation apparatus 330 is relatively fixedly connected with the first rotation apparatus 320 via the support device 340. Since the housing of the second rotation apparatus 330 is relatively fixedly connected with the first rotation apparatus 320, and the rotary shaft of the first rotation apparatus 320 is connected with the camera 310, when the first drive source (e.g., the first motor 332) drives the first rotation apparatus 320 to rotate a predetermined angle around the Z axis, the first rotation apparatus 320 can also drive the camera 310 to rotate the predetermined angle around the Z axis.

By using the above-mentioned method, the first rotation apparatus 320 can drive the camera 310 to rotate around the Z axis (the vertical axis, i.e., the first axis) perpendicular to the horizontal plane, and the second rotation apparatus 330 can drive the camera 310 to rotate around the second axis perpendicular to the first axis.

In some examples, the elevating apparatus 370 of the in-vehicle photography apparatus 300 can drive the in-vehicle photography apparatus 300 to go up or down along the vertical direction, to facilitate the in-vehicle photography apparatus 300 to extend out from inside of the vehicle or retract from outside of the vehicle.

Figure 4:
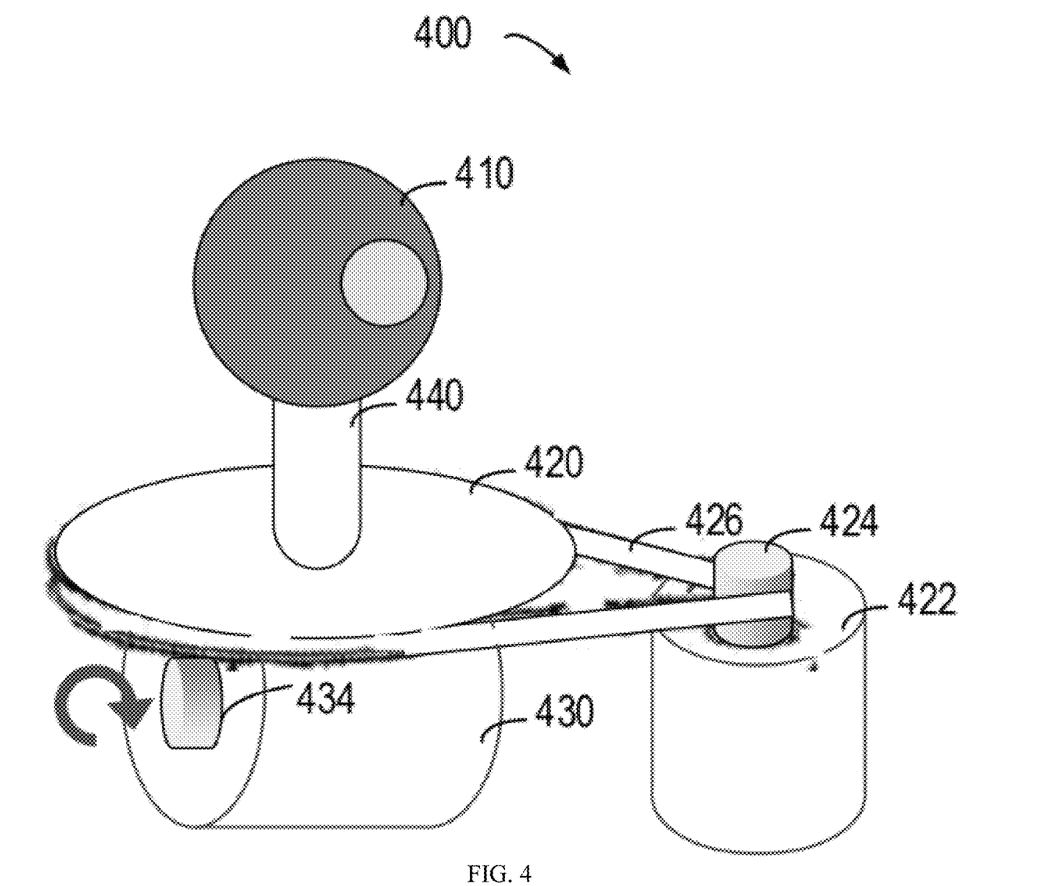
FIG. 4 is a schematic diagram illustrating an in-vehicle photography apparatus 400 according to implementations of the disclosure.

FIG. 4 is a schematic diagram illustrating an in-vehicle photography apparatus 400 according to implementations of the disclosure. It should be noted that the in-vehicle photography apparatus 400 may further include additional structures not shown and/or may omit structures shown, and the disclosure is not limited thereto.

As illustrated in FIG. 4, the in-vehicle photography apparatus 400, for example, includes a camera 410, a first rotation apparatus 420, a second rotation apparatus 430, and an elevating apparatus (not shown).

The first rotation apparatus 420 may rotate from 0 to 360 degrees around the first axis (an axis perpendicular to a first plane) in the first plane (e.g., a plane where the first rotation apparatus 420 is located). The first rotation apparatus 420 is, for example, connected with a rotary shaft of a first drive source (not shown). As shown in FIG. 4, the first rotation apparatus 420 may also be driven to rotate by a rotary shaft 424 of the first drive source (e.g., a first motor 422) and a first drive mechanism (e.g., a gear or a transmission belt 426). The camera 410 is fixedly connected with the first rotation apparatus 420 via a support device 440. The photographing direction of the camera 410 rotates along with rotation of the first rotation apparatus 420. The rotation angle of the first rotation apparatus 420 is, for example, controlled by the first drive signal. For example, the photographing direction of the camera 410 is adjusted a yaw due to the rotation of the first rotation apparatus 420 driven by the first drive signal.

The second rotation apparatus 430 may rotate from 0 to 360 degrees around the second axis (e.g., an axis parallel to the first plane). The second axis is perpendicular to the first axis. In some examples, the second rotation apparatus 430 may also rotate less than 360 degrees. The second rotation apparatus 430 is, for example, connected with a rotation shaft 434 of a second drive source (not shown). In some examples, the rotation angle of the second rotation apparatus 430 is controlled by the second drive signal. For example, the photographing direction of the camera 410 is adjusted a pitch due to the rotation of the second rotation apparatus 430 driven by the second drive signal.

Figure 5:
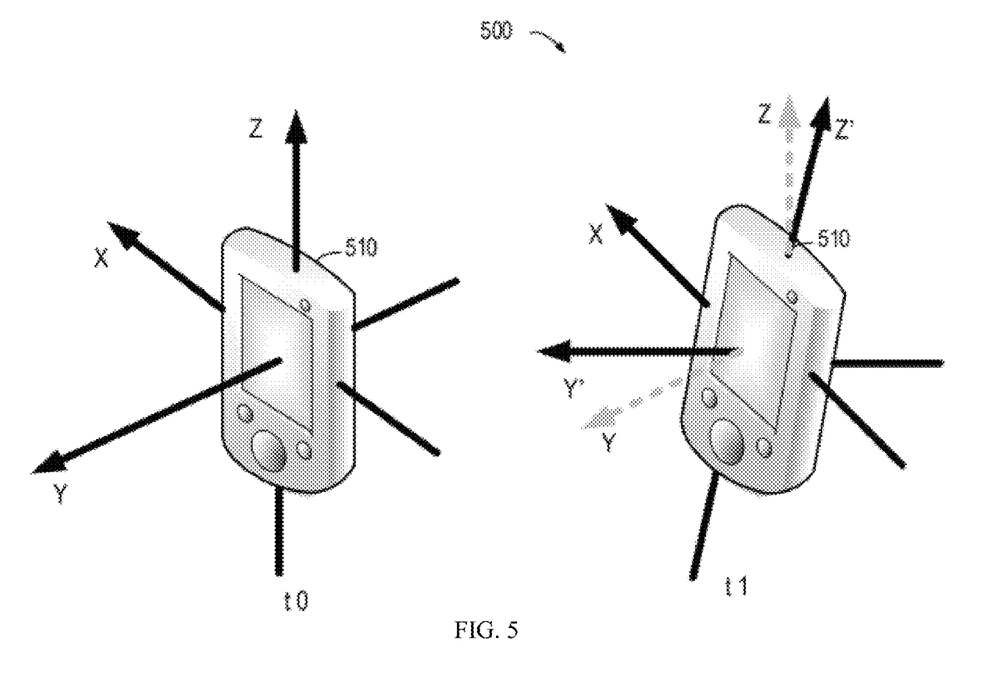
FIG. 5 is a schematic diagram illustrating a method for generating a drive signal according to implementations of the disclosure.

In the following, a method for generating the drive signal configured to adjust the photographing direction of the in-vehicle photography apparatus 300, based on the detecting signal of a pose sensor of a mobile device 510, will be described in detail in conjunction with FIG. 1, FIG. 3 and FIG. 5. FIG. 5 is a schematic diagram illustrating a method for generating the drive signal according to implementations of the disclosure.

As illustrated in FIG. 1, the initial photographing direction of the mobile device 510 at the time point t0 is obtained, when the in-vehicle calculating device 114 of the vehicle 110 determines that the predetermined condition is satisfied.

For example, at the time point t0, angular velocities of the mobile device 510 at three axes obtained by the in-vehicle calculating device 114 are respectively wx, wy, and wz.

For example, at a time point t1, the user 122 rotates the mobile device 510 to a direction different from the direction at the time point t0. For example, at the time point t1, the angular velocities of the mobile device 510 at three axes obtained by the in-vehicle calculating device 114 are respectively wx', wy', and wz'. In order to make the photographing direction of the camera 310 synchronously vary with the pose of the mobile device 510, the in-vehicle calculating device 114 can, for example, integrate the angular velocity collected by the gyro-sensor of the mobile device 510, for calculating an offset angle of the gyro-sensor in a sampling duration between the time point t1 and the time point t0, based on a sampling rate and a sampling period of the gyro-sensor of the mobile device 510, and an angular velocity collected by the gyro-sensor at an i-th sampling. For example, the in-vehicle calculating device 114 calculates that, between the time point t1 and the time point t0, the offset angle of the mobile device 510 rotating around the X axis direction is $\alpha$ and the offset angle of the mobile device 510 rotating around the Z axis direction is $\beta$.

In some examples, the in-vehicle calculating device 114 calculates the first drive signal configured to control the rotation angle of the first rotation apparatus 320, based on the offset angle $\alpha$ of the mobile device 510 rotating around the X axis direction between the time point t1 and the time point t0. The in-vehicle calculating device 114 further calculates the second drive signal configured to control the rotation angle of the second rotation apparatus 330, based on the offset angle $\beta$ of the mobile device 510 rotating around the Z axis direction.

The in-vehicle calculating device 114, for example, drives the first rotation apparatus 320 and the second rotation apparatus 330 to rotate, based on the first drive signal and the second drive signal, such that the yaw adjusted by the photographing direction of the camera 310 is the offset angle $\alpha$, and the pitch adjusted by the photographing direction of the camera 310 is the offset angle $\beta$.

Figure 6:
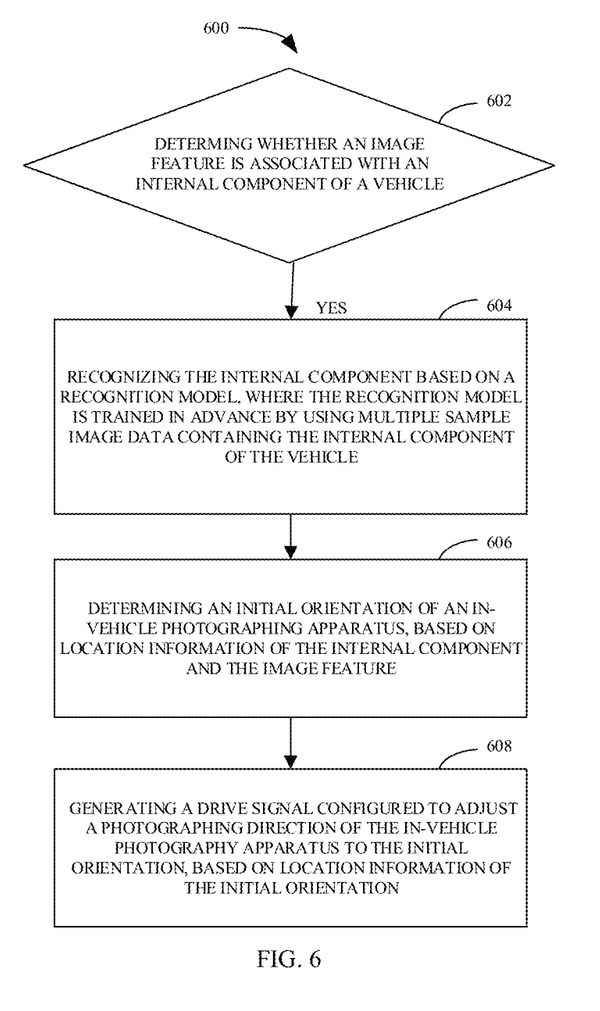
FIG. 6 is a schematic flow chart illustrating a method 600 for adjusting an in-vehicle photography apparatus to an initial orientation according to implementations of the disclosure.

In the following, a method for adjusting the in-vehicle photography apparatus to the initial orientation of implementations of the disclosure will be described in conjunction with FIG. 6. FIG. 6 is a schematic flow chart illustrating a method 600 for adjusting the in-vehicle photography apparatus 112, 300, or 400 to the initial orientation according to implementations of the disclosure. It should be understood that, for example, the method 600 may be performed by the electronic device 700 as shown in FIG. 7 or may be performed by the mobile device 120 or the vehicle 110 (for example, the in-vehicle calculating device 114) as shown in FIG. 1. It should be noted that the method 600 may further include additional actions not shown and/or may omit actions shown, and the disclosure is not limited thereto.

At block 602, the in-vehicle calculating device 114 determines whether the image feature extracted from the image collected by the mobile device 120 is associated with the internal component of the vehicle.

At block 604, the in-vehicle calculating device 114 recognizes the internal component based on a recognition model, when the in-vehicle calculating device 114 determines that the image feature is associated with the internal component of the vehicle 110. The recognition model is trained in advance by using multiple sample image data containing the internal component of the vehicle 110. In some implementations, the in-vehicle calculating device 114 trains, based on multiple training samples, the recognition model, where the recognition model is configured to determine categories of objects to-be-recognized (i.e., the internal component of the vehicle) in images to-be-recognized. In some examples, the recognition model is a neural network model, which can be implemented through algorithm models with different network structures. The training samples are, for example, the multiple manually annotated sample image data containing the internal component of the vehicle 110.

At block 606, the in-vehicle calculating device 114 determines the initial orientation of the in-vehicle photographing apparatus, based on the location information of the internal component and the image feature. The internal components of the vehicle 110 each have a relatively fixed location in the vehicle. Therefore, the in-vehicle calculating device 114, for example, pre-stores the location information of each of the internal components of the vehicle relative to the in-vehicle photography apparatus. The in-vehicle calculating device 114 recognizes the internal component contained in the image collected by the mobile device 120 via the recognition model. The in-vehicle calculating device 114 can determine the drive signal, which is configured to adjust the photographing direction of the in-vehicle photography apparatus to the initial orientation, based on the location information of the internal component and the image feature(s) (e.g., the location of the internal component in the image).

At block 608, the in-vehicle calculating device 114 generates the drive signal configured to adjust the photographing direction of the in-vehicle photography apparatus of the vehicle 110 to the initial orientation, based on location information of the initial orientation.

In the above-mentioned method, it is possible to quickly and accurately adjust the photographing direction of the in-vehicle photography apparatus to the initial orientation matched with the initial photographing direction of the mobile device, by recognizing the internal component with known relative location of the vehicle based on the image feature(s) extracted in the image collected by the mobile device 120.

Implementations further provide a non-transitory computer-readable storage medium. The non-transitory computer-readable storage medium stores a machine-executable instruction thereon, which when executed, causes a machine to perform the method of any of the above implementations of the disclosure.

FIG. 7 is a schematic block diagram illustrating an electronic device 700 applicable to implement implementations of the disclosure. The electronic device 700 may be a device configured to perform the methods 200 and 600 as illustrated in FIG. 2 and FIG. 6. As illustrated in FIG. 7, the device 700 includes a center processing unit (CPU) 701, which can perform various suitable actions and processing according to computer program instructions which are stored in a read-only memory (ROM) 702 or loaded from a storage unit 708 to a random access memory (RAM) 703. In the RAM 703, various programs and data required for the operation of the device 700 can also be stored. The CPU 701, the ROM 702, and the RAM 703 are connected with each other through a bus 704. An input/output (I/O) interface 705 is also connected with the bus 704.

Multiple components in the device 700 are connected to the I/O interface 705, these components including an input unit 706, an output unit 707, and a storage unit 708. The processing unit 701 performs various methods and processing described above, such as the methods 200 and 600. In some implementations, the methods 200 and 600 may be implemented as computer software programs, which are stored in a machine-readable medium, such as the storage unit 708. In some implementations, part or all of the computer programs may be loaded and/or installed on the device 700 via the ROM 702 and/or the communication unit 709. When the computer programs are loaded into the RAM 703 and executed by the CPU 701, one or more operations of the methods 200 and 600 described above may be executed. Alternatively, in other implementations, the CPU 701 may be configured to perform one or more actions of the methods 200 and 600 via other any suitable methods (such as via the aid of firmware).

It should be further noted that, the present disclosure may be a method, device, system, and/or computer program product. The computer program product may include a computer-readable storage medium storing computer-readable program instructions for executing various aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave guide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet by using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create module for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/action specified in the flowchart and/or block diagram block or blocks.

The computer readable program instructions may also be loaded onto a computer, other programmable data processing apparatus, or other devices to cause a series of operational steps to be performed on the computer, other programmable apparatus or other device to produce a computer implemented process, such that the instructions which execute on the computer, other programmable apparatus, or other device implement the functions/actions specified in the flowchart or block diagram block or blocks.

The flowchart and block diagrams in the Figures illustrate the architecture, functionality, and operations of possible implementations of systems, methods and computer program products according to various implementations of the present invention. In this regard, each block in the flowchart or block diagrams may represent a module, segment, or portion of code, which includes one or more executable instructions for implementing the specified logical function (s). In some optional implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or actions, or combinations of special purpose hardware and computer instructions.

The descriptions of the various implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The above are only optional implementations of the disclosure and are not intended to limit the disclosure. For those skilled in the art, the disclosure may have various modifications and variations. Any modification, equivalent arrangements and improvement made within the spirit and principles of the disclosure shall be included in the scope of protection of the disclosure.

What is claimed is:

1. A method for image collection, the method comprising:
   obtaining an initial photographing direction of a mobile device associated with a vehicle in response to determining that a predetermined condition is satisfied comprising determining that verification of validation information from the mobile device passes and that the initial photographing direction of the mobile device coincides with a travel direction of the vehicle;
   adjusting an in-vehicle photography apparatus of the vehicle to an initial orientation, to match a photographing direction at the initial orientation of the in-vehicle photography apparatus with the initial photographing direction of the mobile device;
   generating a drive signal configured to adjust the photographing direction of the in-vehicle photography apparatus based on a detecting signal of a sensor of the mobile device, such that the photographing direction of the in-vehicle photography apparatus synchronously varies with a pose of the mobile device; and
   transmitting a surrounding image collected via the in-vehicle photography apparatus to the mobile device, to display the surrounding image at the mobile device.

2. The method of claim 1, wherein the validation information is obtained by the mobile device via touching or approaching a predetermined location of the vehicle and determining that the predetermined condition is satisfied further comprises determining that a predetermined action at the mobile device is detected.

3. The method of claim 1, wherein obtaining the initial photographing direction of the mobile device comprises:
   obtaining an image collected by a photography apparatus of the mobile device in response to determining that the photography apparatus of the mobile device is turned on;
   extracting an image feature in the image collected by the mobile device; and
   identifying the initial photographing direction of the mobile device based on the image feature.

4. The method of claim 3, wherein adjusting the in-vehicle photography apparatus of the vehicle to the initial orientation comprises:

obtaining the surrounding image collected via the in-vehicle photography apparatus, wherein the in-vehicle photography apparatus is located at a roof of the vehicle; and determining that the in-vehicle photography apparatus is adjusted to the initial orientation in response to determining that the surrounding image is matched with the image feature.

5. The method of claim 3, wherein adjusting the in-vehicle photography apparatus of the vehicle to the initial orientation comprises:

determining whether the image feature is associated with an internal component of the vehicle;

recognizing the internal component based on a recognition model, in response to determining that the image feature is associated with the internal component of the vehicle, wherein the recognition model is trained by using a plurality of sample image data containing the internal component of the vehicle;

determining the initial orientation of the in-vehicle photography apparatus, based on location information of the internal component and the image feature; and generating the drive signal configured to adjust the photographing direction of the in-vehicle photography apparatus of the vehicle to the initial orientation, based on location information of the initial orientation.

6. The method of claim 1, wherein generating the drive signal configured to adjust the photographing direction of the in-vehicle photography apparatus comprises:

determining whether a detecting signal of a pose sensor of the mobile device and a detecting signal of an acceleration sensor of the mobile device are both in a predetermined range; and generating the drive signal configured to adjust the photographing direction of the in-vehicle photography apparatus, based on the detecting signal of the pose sensor of the mobile device, in response to determining that the detecting signal of the pose sensor of the mobile device and the detecting signal of the acceleration sensor of the mobile device are both in the predetermined range.

7. The method of claim 1, further comprising:

transmitting indication information to the mobile device in response to determining that the in-vehicle photography apparatus is already adjusted to the initial orientation; and photographing or recording the surrounding image via the in-vehicle photography apparatus in response to determining that a predetermined voice input or a predetermined operation at the mobile device is detected.

8. The method of claim 1, wherein the in-vehicle photography apparatus is a panoramic photography apparatus at least comprising a camera and a first rotation apparatus configured to drive the camera to rotate around a first axis.

9. The method of claim 8, wherein the in-vehicle photography apparatus further comprises:

a second rotation apparatus configured to drive the camera to rotate around a second axis; and an elevating apparatus configured to drive the camera to move in a vertical direction, wherein the second axis is perpendicular to the first axis.

10. The method of claim 1, wherein generating the drive signal configured to adjust the photographing direction of the in-vehicle photography apparatus comprises:

obtaining pose angle change information of a current orientation of the mobile device relative to an orientation corresponding to the initial photographing direction; and generating the drive signal configured to drive at least one of a first rotation apparatus or a second rotation apparatus to rotate, based on the pose angle change information.

11. The method of claim 1, wherein the drive signal comprises at least one of:

a first drive signal configured to drive a first rotation apparatus; or a second drive signal configured to drive a second rotation apparatus.

12. A non-transitory computer-readable storage medium storing one or more machine-executable instructions thereon, which when executed, cause a machine to:

obtain an initial photographing direction of a mobile device associated with a vehicle in response to determining that a predetermined condition is satisfied comprising determining that verification of validation information from the mobile device passes and that the initial photographing direction of the mobile device coincides with a travel direction of the vehicle;

adjust an in-vehicle photography apparatus of the vehicle to an initial orientation, to match a photographing direction at the initial orientation of the in-vehicle photography apparatus with the initial photographing direction of the mobile device;

generate a drive signal configured to adjust the photographing direction of the in-vehicle photography apparatus based on a detecting signal of a sensor of the mobile device, such that the photographing direction of the in-vehicle photography apparatus synchronously varies with a pose of the mobile device; and transmit a surrounding image collected via the in-vehicle photography apparatus to the mobile device, to display the surrounding image at the mobile device.

13. A vehicle, comprising an in-vehicle calculating device and an in-vehicle photography apparatus, wherein the in-vehicle calculating device is configured to:

obtain an initial photographing direction of a mobile device associated with the vehicle in response to determining that a predetermined condition is satisfied comprising determining that verification of validation information from the mobile device passes and that the initial photographing direction of the mobile device coincides with a travel direction of the vehicle;

adjust the in-vehicle photography apparatus to an initial orientation, to match a photographing direction at the initial orientation of the in-vehicle photography apparatus with the initial photographing direction of the mobile device;

generate a drive signal configured to adjust a photographing direction of the in-vehicle photography apparatus, based on a detecting signal of a sensor of the mobile device, such that the photographing direction of the in-vehicle photography apparatus synchronously varies with a pose of the mobile device; and transmit a surrounding image collected via the in-vehicle photography apparatus to the mobile device, to display the surrounding image at the mobile device; and the in-vehicle photography apparatus is equipped at a roof of the vehicle and at least comprises:

a camera configured to collect the surrounding image, wherein the surrounding image is transmitted to the mobile device for display; and a first rotation apparatus configured to drive the camera to rotate around a first axis.

14. The vehicle of claim 13, wherein the in-vehicle photography apparatus further comprises:

a second rotation apparatus configured to drive the camera to rotate around a second axis; and an elevating apparatus configured to drive the camera to move in a vertical direction, wherein the second axis is perpendicular to the first axis.

15. The vehicle of claim 14, wherein the in-vehicle photography apparatus further comprises a near field communication (NFC) module configured to cause the mobile device to obtain validation information for verification of the mobile device via touching or approaching the in-vehicle photography apparatus.

16. The non-transitory computer-readable storage medium of claim 12, wherein the validation information is obtained by the mobile device via touching or approaching a predetermined location of the vehicle and the machine-executable instructions, when executed, further cause the machine to determine that a predetermined action at the mobile device is detected.

17. The non-transitory computer-readable storage medium of claim 12, wherein the machine-executable instructions, when executed, further cause the machine to:

obtain an image collected by a photography apparatus of the mobile device in response to determining that the photography apparatus of the mobile device is turned on; and extract an image feature in the image collected by the mobile device; and identify the initial photographing direction of the mobile device based on the image feature.

18. The non-transitory computer-readable storage medium of claim 17, wherein the machine-executable instructions, when executed, further cause the machine to obtain the surrounding image collected via the in-vehicle photography apparatus, wherein the in-vehicle photography apparatus is located at a roof of the vehicle; and determine that the in-vehicle photography apparatus is adjusted to the initial orientation in response to determining that the surrounding image is matched with the image feature.

19. The non-transitory computer-readable storage medium of claim 17, wherein the machine-executable instructions, when executed, further cause the machine to:

determine whether the image feature is associated with an internal component of the vehicle;

recognize the internal component based on a recognition model, in response to determining that the image feature is associated with the internal component of the vehicle, wherein the recognition model is trained by using a plurality of sample image data containing the internal component of the vehicle;

determine the initial orientation of the in-vehicle photography apparatus, based on location information of the internal component and the image feature; and generate the drive signal configured to adjust the photographing direction of the in-vehicle photography apparatus of the vehicle to the initial orientation, based on location information of the initial orientation.

20. The non-transitory computer-readable storage medium of claim 12, wherein the machine-executable instructions, when executed, further cause the machine to:

determine whether a detecting signal of a pose sensor of the mobile device and a detecting signal of an acceleration sensor of the mobile device are both in a predetermined range; and generate the drive signal configured to adjust the photographing direction of the in-vehicle photography apparatus, based on the detecting signal of the pose sensor of the mobile device, in response to determining that the detecting signal of the pose sensor of the mobile device and the detecting signal of the acceleration sensor of the mobile device are both in the predetermined range.

* * * * *